Jan. 21, 1969 K. C. RIPLEY 3,422,782
PASSIVE TANK STABILIZER WITH FREEDOM IN DIRECTION OF SWAY
Filed Nov. 30, 1967 Sheet _1_ of 8

INVENTOR
Kenneth C. Ripley

BY Stevens, Davis, Miller & Mosher
ATTORNEYS

Fig. 13

United States Patent Office 3,422,782
Patented Jan. 21, 1969

3,422,782
PASSIVE TANK STABILIZER WITH FREEDOM
IN DIRECTION OF SWAY
Kenneth Clay Ripley, Washington, D.C., assignor, by
mesne assignments, to Flume Stabilization Systems, Inc.,
Hoboken, N.J., a corporation of New Jersey
Continuation-in-part of application Ser. No. 675,746,
Sept. 29, 1967, which in turn is a continuation-in-part
of application Ser. No. 602,731, Dec. 20, 1966. This
application Nov. 30, 1967, Ser. No. 691,100
U.S. Cl. 114—125          15 Claims
Int. Cl. B63b 43/06

ABSTRACT OF THE DISCLOSURE

A tank stabilizer for vessels such as boats or the like comprising an elongated tank located at or above the roll axis with its long axis arranged athwartship, a body of liquid partially filling said tank so as to move toward the ends of the tank in response to roll, means supporting said tank on the vessel for movement and displacement relative to the vessel in direction of sway in response to forces imparted to the tank by the tank liquid. In one embodiment, only the liquid container end walls move in sway relative to a housing and in another embodiment the entire liquid containing tank is independently housed for movement in sway.

*Reference to other patent applications*

This is a continuation-in-part patent application of my co-pending patent application bearing S.N. 675,746 filed Sept. 29, 1967, entitled, Passive Tank Stabilizer with Freedom in Direction of Sway, which was a continuation-in-part application of my application bearing Ser. No. 602,-731 filed Dec. 20, 1966 entitled, Passive Tank Stabilizer with Freedom in Direction of Sway, both now abandoned.

The present invention relates to passive tank stabilizers and more particularly to a passive tank stabilizer which is free to move in the direction of sway resulting in a more efficient use of the stabilizing medium than was heretofore possible.

Recent developments in passive stabilizers have made roll stabilization economically possible and technically practical. For example, the new techniques disclosed in United States Patent No. 3,054,373 have been accepted by the industry and are now being used on a worldwide scale.

Although the concepts of the above-mentioned patented stabilizers are readily applicable to large vessels such as ocean liners, bulk cargo carriers, tankers or the like, it has been found that to apply these concepts to smaller boats, such as pleasure craft, requires more sophisticated systems than for the larger vessels. For example, stabilization systems in ships are capable of imparting adequate stabilizing moments when the weight of stabilizing medium is within the range of about one and a half to two percent of displacement. A principal reason for this factor is that the relatively long roll period for ships signifies that ships as compared with boats are relatively tender (that is, not stiff) in roll, so require less stabilizing moment per ton of displacement. Furthermore, boats are subjected to greater wave slopes, at rolling resonance, than are ships, and the rolling of boats is more chaotic, that is, more transient, than is the rolling of ships.

The foregoing differences in character of roll between the rolling of ships and the rolling of boats means that while the stabilizing of boats requires more sophistication in knowledge and in methods used than in the case of ships, the much shorter period of roll of boats makes the need for stabilization greater in the case of boats than in the case of ships. The short period of roll of boats means that the acceleration in roll is very great, in rough water, and it is acceleration that causes discomfort, and that can cause passengers to be injured by being thrown about on the boat. The resonant period of a 27-foot boat is about 2.2 seconds, and for a 36-foot boat is about 3.2 seconds. The resonant period of a ship will be about 9 to 14 seconds, depending upon the size and the character of service of the vessel. A boat must be designed for an effective wave slope about ⅓ to ⅔ greater than the effective wave slope exerted in the roll of a ship.

It has been found that a boat of 18,800 pound displacement can be stabilized to an impressive degree for all seas ever likely to be encountered, if the weight of stabilizing medium is allowed to be roughly 4 percent of displacement, when operation is to be in the very roughest sea. This would be a weight of stabilizing medium of roughly 760 pounds. While this figure of 4 percent of displacement must be regarded as large, it could not be said to be excessive as the price for getting good roll stabilization if nothing more efficient in use of weight and space could be deviced.

An attempt to speak about having reduced the required weight and space of a stabilizer for boats has been made at various times and in various ways, but these method have all suffered from unsatisfactory operation. With these more severe requirements imposed on the stabilizer, no known method has solved the problem of reducing required weight nad space much if any below the figure of 4 percent named above.

Nothwithstanding the difficulty of the problem, the search continues for a design of passive stabilizer that will provide better roll reduction for boats with less required weight and space for the installation.

It is a primary object of the present invention to provide a new and improved stabilization system for a boat or the like, which system achieves sensational results over those obtained with prior known stabilizers.

It is another object of the invention to provide a new and improved tank liquid damping member design that develops a substantially fixed effective throat dimension through which the tank liquid passes regardless of the tank liquid velocity over a substantial operating range. Thus, with this new member design, the amount of damping imparted to the tank liquid is more reliably designed and the tank parameters can be optimized for better tank performance.

Briefly stated, the invention includes a passive tank stabilizer fitted with rows of nozzles or the like which tank is mounted for movement in sway relative to the boat. The static and dynamic pressures developed by the tank liquid being transferred cause periodic, quadrature displacements of the tank in sway.

In view of the above, it is an object of the present invention to provide a roll stabilizer which has some degree of freedom in sway so as to physically displace in response to the static and dynamic forces in direction of sway created by the transferring liquid medium.

Other and further objects of the present invention will become apparent with the following detailed description when taken in view of the appended drawings in which:

*Detailed description of the embodiments*

Figure 1:
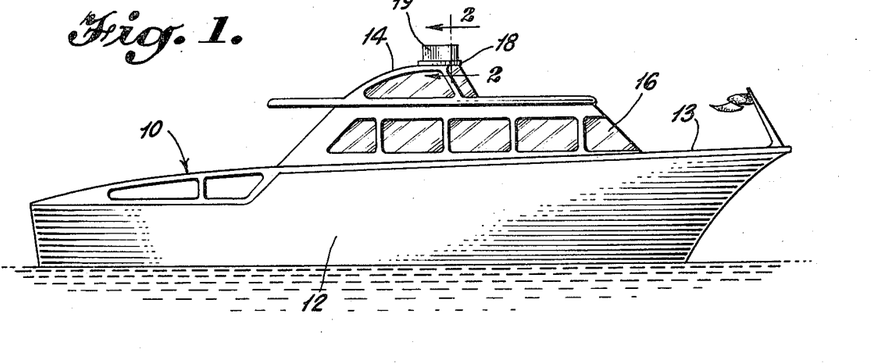
FIGURE 1 is a side elevation of a craft with the stabilizer of the present invention mounted thereon.

With reference to the drawings, reference 10 generally designates a small boat having a hull 12, cockpin or bridge 14 with top or roof 18, deck 13 and cabin 16. A passive stabilization system generally designated as 19 is secured to the forward part of top 18 by any conventional means. It is preferred to locate stabilizer 19 at the highest practical position.

According to one example of the invention, the stabilizer includes an outer protective housing 20 which is generally rectangular in cross section and elongated in the athwartship direction. Housing 20 is symmetrically mounted relative to the vertical centerline plane of craft 10 and extends from one side of the craft to the other, such as between hand rails.

Within housing 20 is arranged an elongated rectangular tank 22 which serves as the enclosed container for a body of liquid 24. The tops of housing 20 and tank 22 may be removable to expose the interiors thereof. Liquid body 24 partially fills tank 22 to a level calculated so that the liquid oscillation within the tank matches the resonant roll frequency of the craft. Although the selected tank material can be purposely heavy to develop further stabilizing moment, it is preferred that the ratio weight of tank liquid 24 to weight of the tank 22 be large and that the choices of tank material and liquid medium be made accordingly. Aluminum and steel are suitable examples of tank material and fresh water, sea water, oil, reserve fuel, solid suspensions or other high density liquids could suitably serve as tank liquid 24.

In the disclosed example, a divider plate 26 is positioned along the centerline of tank 22 dividing the tank into two isolated elongated and parallel compartments 28 and 30. In essence, each compartment 28 and 30 operates individually as far as liquid transfer is concerned. Depending upon the parameters of the particular boat being stabilized, there may be but one compartment in tank 22. For boats having extremely short roll periods, such as 2.2 seconds, it is preferred that tank 22 be partitioned along the boat's centerline into two separate tanks arranged end to end transverse to the boat. With the effective transverse tank dimension reduced, the liquid in each tank will have a shorter natural period of oscillation to match the roll of the boat.

Each compartment is fitted with a plurality of constricted openings formed by upstanding cylindrical pipes or tubes 32 extending from the floor to the top of tank 22. Each pipe 32 is fitted with a plate 34 the width of which is greater than the pipe diameter so that the extremities of plate 34 form fins or discontinuities 36 at opposite sides of pipe 32. If desired, pipes 32 may have other suitable cross sections beside circular. As is evident from the drawings, pipes 32 are spaced from each other and aligned in longitudinal rows at various distances from the center of their respective compartment. In this way, each adjacent pair of pipes defines an upstanding nozzle or constriction 38 which controls the liquid transfer in a manner described below. Fins 36 are aligned in the longitudinal direction and serve as definite effective boundaries for the constrictions 38. The pipes in the centermost rows are spaced further apart than the pipes in the outermost rows so that constricted openings 38 are designed with greater areas toward the center of the tank than the openings near the ends of the tank. It is preferred that the nozzle dimensions to be related to their tank positions such that liquid transfer approximates the oscillation of a pure standing wave. For further disclosure of how such a wave can be developed and of the nozzle dimensions required, see United States Patent No. 3,256,847.

Figure 4:
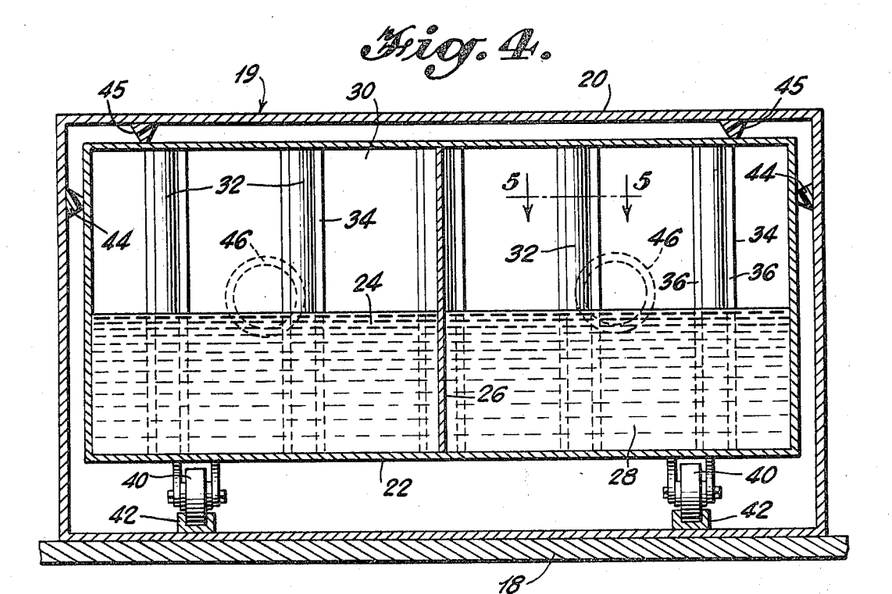
FIGURE 4 is a longitudinal vertical section taken along line 4—4 of FIGURE 3.
Figure 5:
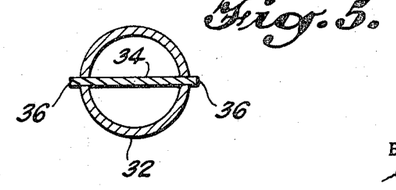
FIGURE 5 is a cross section through one of the nozzle tubes taken on line 5—5 of FIGURE 4.

Tank 22 is initially arranged symmetric within housing 20 but with housing 20 fixed to craft 10, tank 22 is mounted for movement in sway, i.e., in the athwartship direction or parallel to the long axis of the tank. To accomplish movement, tank 22 is supported on rollers or wheels 40 suitably spaced beneath the floor of the tank. If a certain amount of energy dissipative friction is desired, skids or other known friction means can be provided in place of or to supplement wheels 40. A pair of upstanding U-shaped tracks 42 are secured to the floor of housing 20 and extend the length thereof serving to receive wheels 40 and act as a directional guide therefor. To prevent binding between the relatively moving walls of tank 22 and housing 20, a pair of nylon bumpers 44 are secured to the upstanding walls of housing 20 and similar bumpers 45 are secured to the roof of housing 20 generally as shown in FIGURE 4. Bumpers 44 therefore serve to prevent unwanted relative longitudinal or vertical movement between tank 22 and housing 20. Shafts and lubricated bushings might be substituted as an alternate for the wheels and bumpers, as more simple, and possibly more quiet.

Tank 22 is axially coupled to the craft by springs 46 which serve to smooth out the axial accelerations and displacement and apply dynamic stabilizing forces to the craft. Moreover, at certain parts of the roll cycle, springs 46 enhance liquid movement relative to tank 22 by applying a force to tank 22 in a direction opposite to the liquid momentum. The springs may have any suitable constant calculated for the particular tank. The spring constant should be large enough to prevent at any time a total spring compression. For some applications, it might be judged desirable to provide in addition to springs 46 damping for relative movement of tank 22 and container 20, by use of dashpots or other equivalent means.

The operation of the invention will be described with reference to FIGURES 6 through 9. With tank 22 filled with liquid to a level sufficient to tune the liquid oscillation with the resonant roll of the craft, tank 22 remains centered and no liquid transfer occurs until the boat begins to roll. As the boat rolls, the tank liquid moves in response thereto toward the lowering side of the boat. As with the case of conventional tank stabilizers, this shift of the liquid mass imparts a static stabilizing moment component to the craft in opposition to roll. For optimum results, the tank geometry and constricted openings are designed so that liquid oscillation at resonance lags the roll of the boat by 90°. In addition to the static moment, the motion of the liquid and tank displacement create a dynamic vector component or a whipping force which is in turn imparted to the craft through springs 46. For roll at resonance, the tank liquid has maximum velocity when the craft roll angle is at a maximum. As described below, the reactive whipping force has the proper direction, i.e., in opposition to upsetting wave forces applied to the craft.

With prior systems fixed in sway, the moment arm of the static portion of stabilizing moment depends solely upon the shift of the liquid center of gravity within the tank. With the present invention, remarkable results are obtained by freeing tank 22 in sway so that when there is this shift of the liquid center of gravity within the tank, there is also a displacement of the tank itself in the same direction, so that the static moment is augmented by the additional moment just described. At the same time, the quadrature component of displacement in sway has acted to increase the amplitude of the standing wave, so that further gain in stabilizing moment has been achieved. Finally, due to sway, the profile of the standing wave has been altered from being a pure sinusoid, and so contributes further stabilizing moment.

Figure 6:
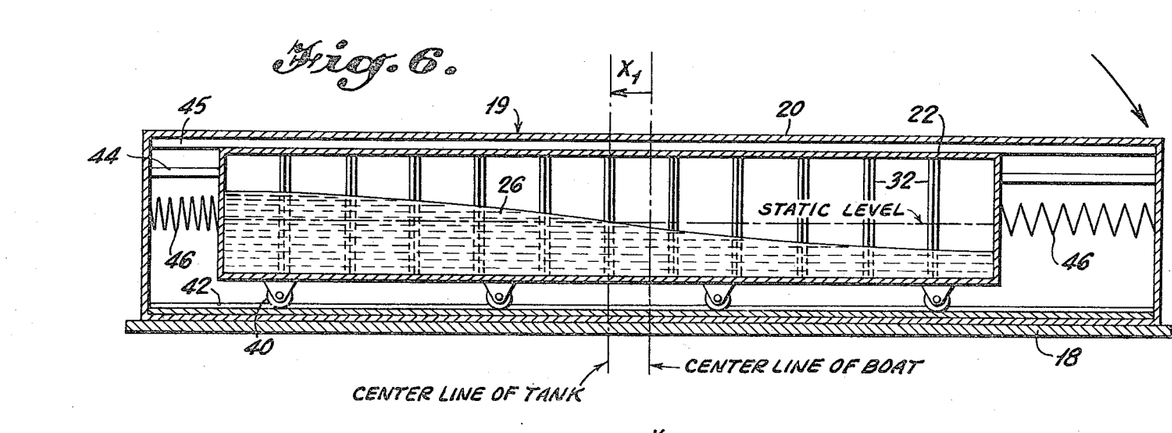
FIGURES 6-9 are views similar to FIGURE 2 showing the condition of the stabilizing medium at corresponding parts of the roll cycle.
Figure 7:
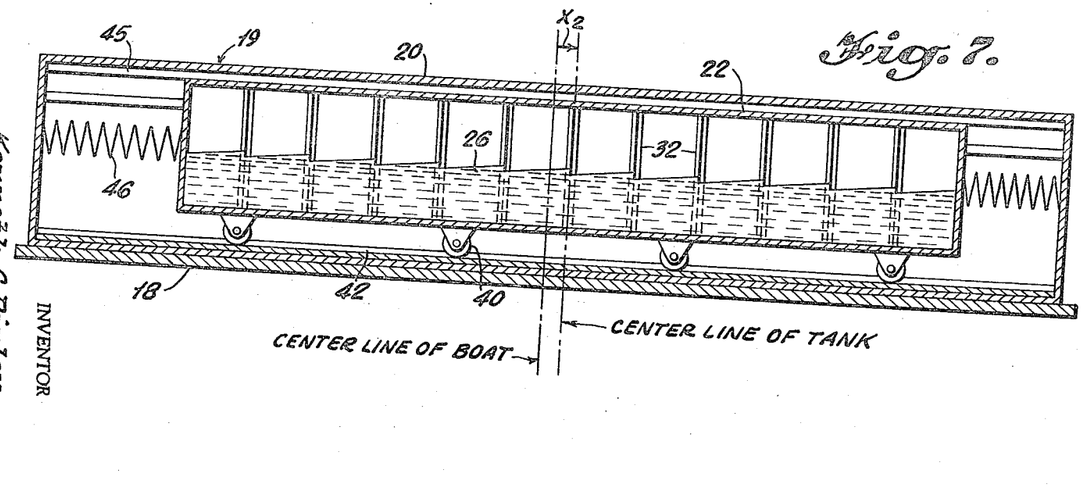

FIGURES 6 through 9 show one cycle of a steady-state resonant roll. In FIGURE 6, viewing the craft head on, with the craft upright and rolling clockwise, tank 22 is displaced to the left by a distance $X_1$ so that the liquid center of gravity stabilizes with a moment arm increased by $X_1$. One quarter cycle later, as seen in FIGURE 7, craft 10 is at maximum roll to the right and the tank liquid has maximum velocity to the right. In this view, the tank liquid has built up maximum pressure head at each constricted opening 38 as well as an unbalanced force due to hydrostatic pressure on the ends of the tank 22 itself. These forces due to tilt of the water planes have caused maximum out-of-phase displacement $X_2$ of the tank 22, and so have caused maximum augmentation of tilt of the water planes due to inertia reaction of sway. This is the effect that causes increased transfer through having freed the stabilizer in sway.

Figure 8:
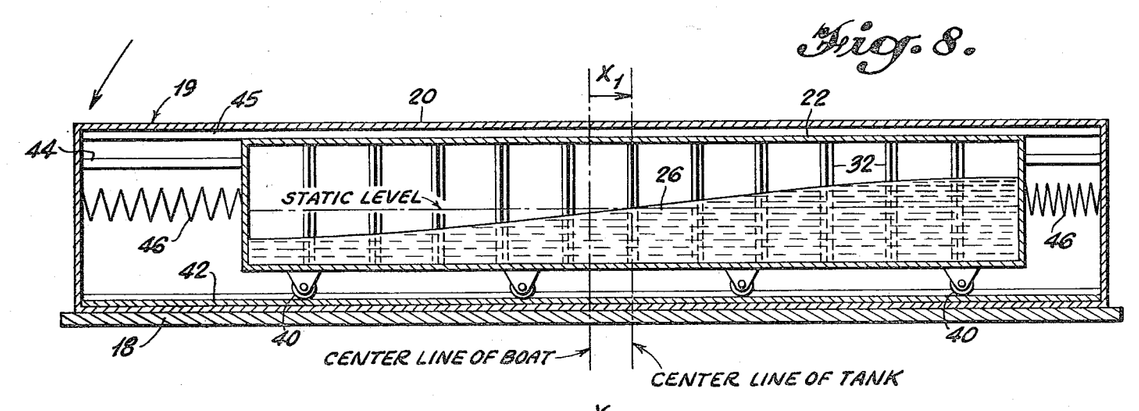

One quarter cycle later than FIGURE 7, tank 22 has displacement $X_1$ to the right and the tank liquid has a maximum displacement to the right, FIGURE 8. In this view, the static stabilizing moment due to transfer is again augmented by the particular added stabilizer moment that is the product of the stabilizer weight and the moment arm $X_1$. One quarter cycle later, as seen in FIGURE 9, sway displacement $X_2$ is again causing maximum tilt of the water planes, but this time in the clockwise direction.

The above action continues as long as craft 10 continues to roll.

Figure 9:
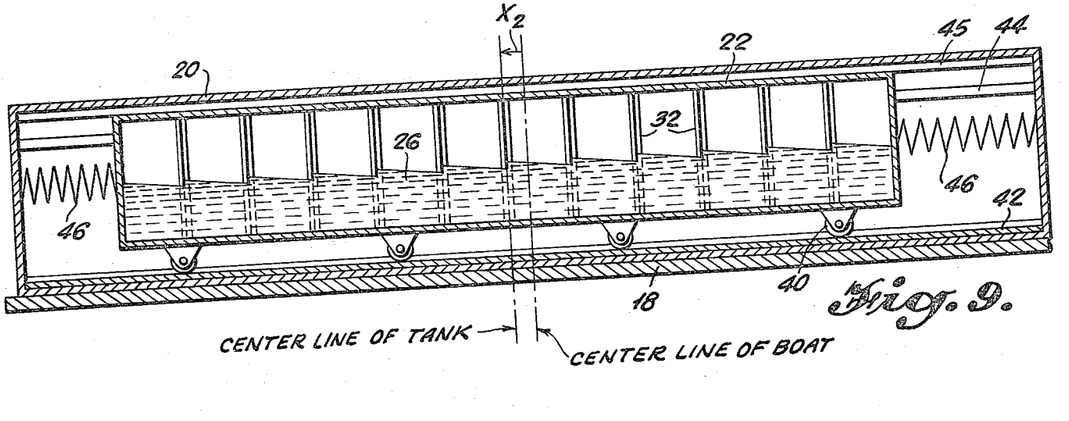
Figure 10:
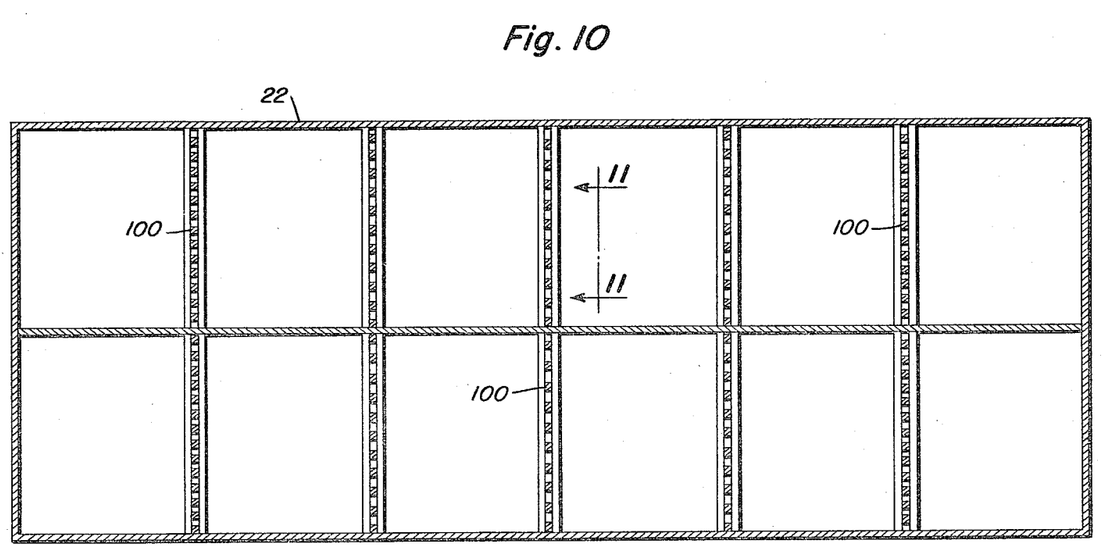
FIGURE 10 is a horizontal sectional view of the second embodiment of the invention.
Figure 11:
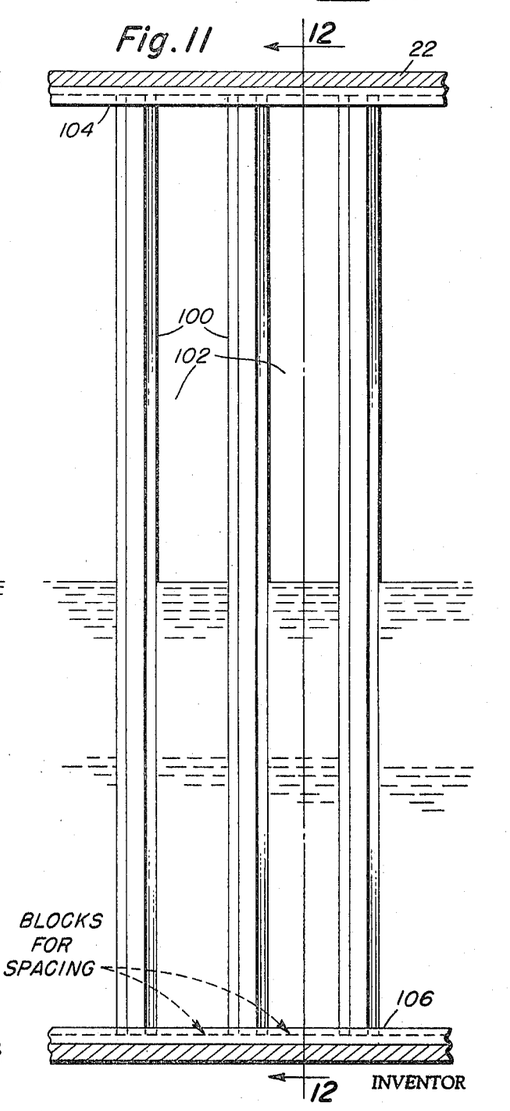
FIGURE 11 is a vertical section through a part of the tank of FIGURE 10 taken along line 11—11 of FIGURE 10.
Figure 12:
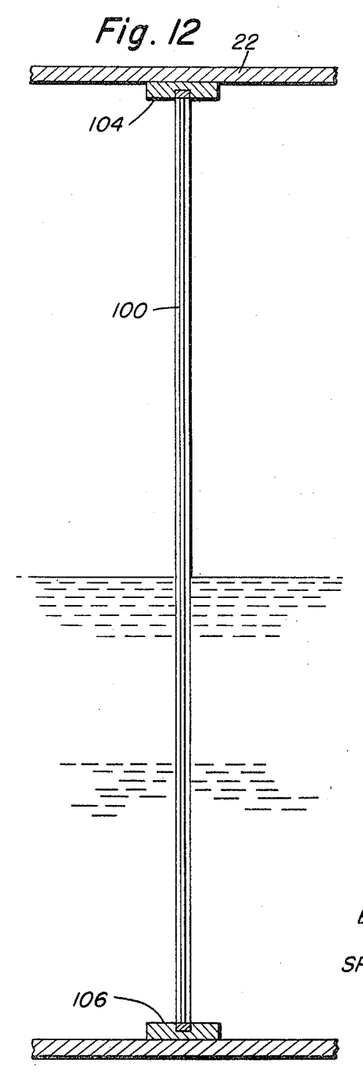
FIGURE 12 is a vertical sectional view taken along line 12—12 of FIGURE 11.

Sway displacement $X_2$, FIGURE 7, is reversed in FIGURE 9, and so is to the left of zero in this view, just as sway displacement $X_1$, FIGURE 6, which follows FIGURE 9, is to the left. Thus, sway displacement $X_2$ reversed and sway displacement $X_1$ combine vectorially to give a resultant sway displacement $X_{max}$. This means that sway displacement is not maximum in FIGURES 6 and 8, and sway displacement is not zero in FIGURES 7 and 9.

The significance of the two quadrature displacements of tank 22 will now be described. One of these quadrature displacements ($X_1$) permits the weight of stabilizing liquid to operate at increased moment arm from that for simple transfer of liquid in a tank fixed in sway. This additional moment arm develops additional stabilizing moment. The other displacement in sway ($X_2$) occurring 90° later provides additional force on the rows of nozzles of the stabilizer as the boat is inclined. The additional pressure drop across the rows of nozzles resulting therefrom causes additional dissipation of energy during a cycle of roll, to balance with the additional input of energy to the stabilizer per cycle of roll (for the roll treated as being steady-state).

Besides the additional stabilizing moment described in the above paragraph, the inclusion of sway adds two additional stabilizing moments. One of these additional stabilizing moments is that due to additional transfer of stabilizing medium as additional amplitude of standing wave. The impulse for this greater amplitude of standing wave comes from the greater pressure drop across the rows of nozzles when the boat is inclined, and this force acting to cause greater flow through the nozzles is the force of inertia reaction as the stabilizing medium undergoes reversal in the magnitude and direction of velocity of sway displacement responsible for the added transfer described above.

When the above standing wave would be at crest height as a conventional standing wave, it is actually at somewhat greater crest height than this, due to the fact that at crest height, the wave is undergoing acceleration in sway (due to the other, quadrature component of displacement in sway). This other acceleration in sway occurs when equilibrium of forces is easily established, and the required equilibrium is an alteration of the wave profile. The wave profile instead of being sinusoidal is distorted by inertia reaction, a pile-up of liquid that represents additional unbalanced force at the ends of the tank. This additional force has moment arm about the axis of roll, and comprises an additional stabilizing moment. It is this final effect of sway that allows reaching a balance between the flow of energy into the stabilizer and the flow of energy out of the stabilizer, for roll stipulated to be steady-state. It should be understood that the complex pile-up condition of the tank liquid is not shown in the drawing.

In one embodiment of the invention, the passive stabilizer is designed to be installed in a boat having an overall length of 36' and displacement of 18,780 pounds with a natural roll of 1.99 radians per second. The boat under study is further characterized by having a static stability of 889 pound feet per degree heel and a moment of roll inertia of 12,747 pound feet second squared. The distance from the axis of roll to the axis of sway for tank 22 is set at 5.75 feet, and the metacentric height of the boat is 2.71 feet. The inside athwartship dimension of tank 22 is 6'9" and the complete fore and aft inside dimension is 31". Tubes 32 were chosen to be ⅞ of an inch outer diameter with plates or fins 34 extending 1/16 of an inch on either side to define the constricted openings 38. Eleven rows of openings 38 were chosen and the opening areas were calculated on the basis disclosed in the aforementioned United States Patent No. 3,256,847. The static liquid level is calculated to be 6.125 inches with a specific liquid weight of 87.14 pounds per cubic foot and an overall weight of tank liquid being 775.6 pounds. For a system designed such that $X_1$ has an amplitude of about 4" when the amplitude of stabilized roll is 1.20°, the total spring constant for springs 46 is approximately 230 pounds per foot. The amplitude of $X_2$ for this amplitude of roll is about 2.2". The factor by which stabilizing moment from all other sources is increased by the pile-up change in profile of standing wave as explained is 1.161, or calculated for the above values of sway displacement $X_1$ and $X_2$.

Mathematical calculations of the above stabilizer reveal the remarkable results that when the boat rolls with an amplitude of 1.20°, the stabilizing moment developed by stabilizer 19 is approximately 1,160 pound feet assuming a steady-state roll at resonance, i.e., the total energy dissipated by stabilizer 19 equals the total amount of roll energy imparted to the stabilizer by wave forces per cycle of roll. Of equal importance, the roll reduction achieved by the invention is 89.4% while the corresponding figure for a stabilizer with the same tank design but without freedom in sway is 72.6%. As a further comparison, the stabilizer fixed in sway will not develop a stabilizing moment of 1,160 pound feet until the amplitude of roll is 4.80°, i.e., four times greater than the 1.20° achieved by the invention. Also, the stabilizer fixed in sway does not provide full moment (rated capacity) until the amplitude of roll is 9.60° at which roll the stabilizing moment developed is 1,650 pound feet. The invention develops the same stabilizing moment when the amplitude of roll is only 2.40° which is 63% of rated capacity which is 2,622.6 pound feet. Therefore, the invention increases the rated capacity to 1.587 times that of a stabilizer fixed in sway. The invention reaches rated capacity when amplitude of roll is 6.06°.

These figures signify that the stabilizer according to the invention performs with extreme efficiency and has advanced capabilities of rendering more stabilization to the boat even at small roll angles. With large stabilization forces developed at small roll angles, the craft may never have the chance to roll at the higher amplitudes. Therefore, the weight of liquid medium and overall dimension of the stabilizer can be reduced without serious effect on capability of the stabilizer. This will permit a smaller and more compact unit with sleek design which is within what is compatible with the asthetic appearance and economic design of the craft.

The following guide lines represent one approach the designer can take when designing the invention for a particular boat:

(1) Assuming a steady-state resonant roll, establish a basic premise that all energy imparted to the craft to make it roll at some assigned amplitude must be dissipated by the stabilizer on a per cycle basis.

(2) Design a stabilizer fixed in sway to accomplish (1) above. This design may be made in accordance with the principles disclosed in United States Patent No. 3,256,847.

(3) Define a problem of solving for a particular sway displacement (feet) to dissipate twice (or some other factor) the energy per cycle as the stabilizer of (2) above for the same amplitude of roll.

(4) Solve for the spring constant that will give the displacement of (3) above.

(5) Check by solving for the magnitudes of all stabilizing moment components and calculate the energy input per cycle and compare this with the energy dissipated per cycle.

Thus there has been disclosed a new and improved stabilizer for small boats and the like which has freedom in the direction of sway to permit the development of greater stabilizing forces and so open the way to reductions in required size and weight. Although the invention has preferred utility with small boats, it is apparent that its use is not restricted thereto and with proper dimension changes and the like, the stabilizer can be used in large ships without departing from the invention.

Figure 13:
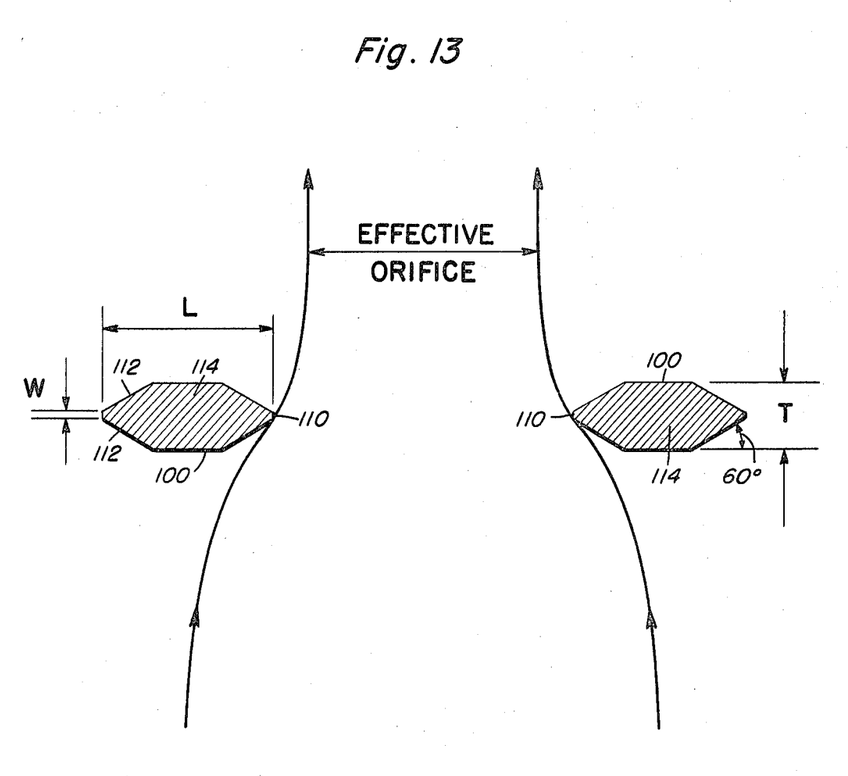
FIGURE 13 is a horizontal section through the plate member of FIGURE 11 taken along line 13—13 of FIGURE 11 diagrammatically showing a vena contracta.

Referring now to FIGURES 10–13, another embodiment of tank 22 is illustrated which includes an improved damping arrangement in the form of rows of upstanding plate members 100 spaced fore and aft to form upward elongated orifices 102. It is preferred that the orifice dimensions be progressively greater toward the centerline of the tank 22 and that the spacing between rows be sufficient to allow dissipation of the jet flow in the liquid after it passes through one row but before it reaches the next row. Plates 100 can be secured within the tank by any suitable means such as top and bottom grooved bases 104 and 106 formed integrally with the tank. As seen in FIGURE 13, the cross section of plates 100 is symmetrical about a fore and aft centerline 108 and includes a pair of sharp side edges 110. Bevel surfaces 112 intersect edges 110 at an angle greater than 30° and preferably 60°. The center region 114 of member 110 is thickened to provide sufficient structural resistance to bending during operation.

With this configuration, each adjacent pair of plate members 110 forms an orifice that operates as an analogous (modified) VDI orifice for both directions of flow and that has a two-dimensional flow characteristic. With the bevelled surfaces and sharp edge as shown, the flow passages 102 are bound by extremely abrupt discontinuities so that the flow does not follow the contour of the plates but instead breaks away from the influence of the plates at predetermined locations relative to the plate edge positions. This action is known as the orifice principle. Because of the reasonably sharp edges 102 and bevelled surface angle, the plate members 100 do not exhibit a critical Reynolds number, thus making the effective orifice dimension reliably predictable.

In one example of the invention, the horizontal dimension of the edge surface (W) is one-tenth the thickness (T) of a member having a length (L) of about 2½T. The bevel angle is 60°.

Therefore, a tank stabilizer fitted with the improved plate member design defining rows of adjacent orifices can be designed to include a coefficient of internal damping, the value of which is more reliably calculated so that the relationship of all tank parameters can be optimized for the most efficient tank operation. It will be understood that the orifice configuration as discolsed herein has general utility in any free surface passive tank stabilizer configuration with or without freedom in sway.

Figure 14:
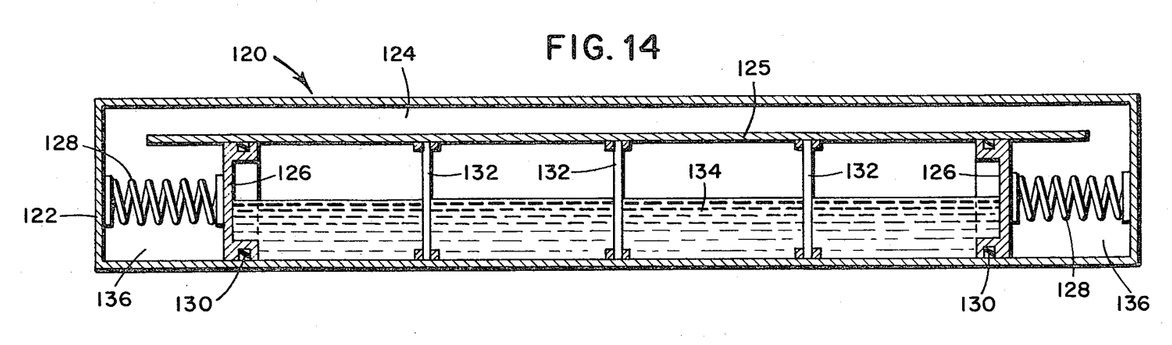
FIGURES 14 and 15 are a longitudinal vertical section and horizontal section of still a further embodiment of the invention.
Figure 15:
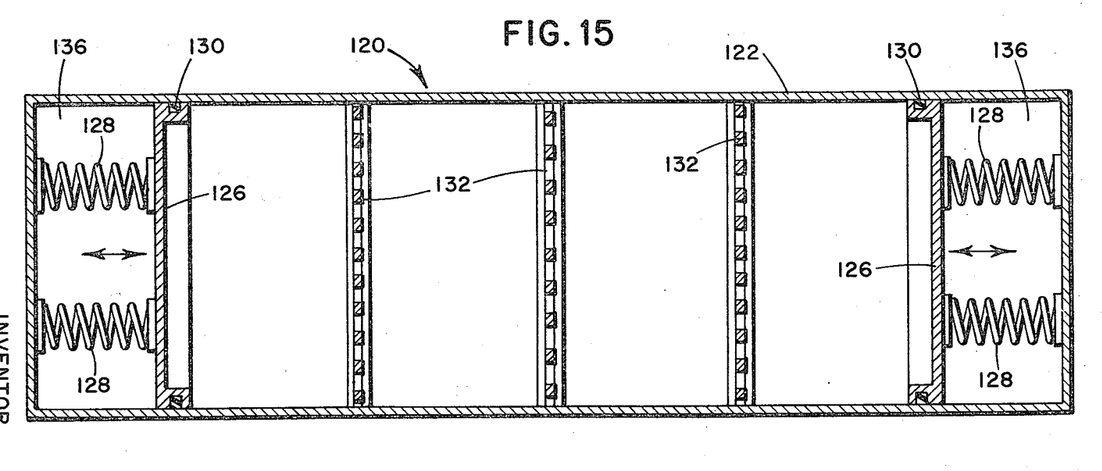

Another embodiment of the invention 120 is illustrated in FIGURES 14 and 15 and unlike the aforementioned stabilizers only the outboard end boundaries of the liquid container move in the direction of sway so as to effectively move the container centerline in sway. Stabilizer 120 includes a primary tank or housing 122 generally rectangular in cross section. A pair of pistons 126 having conventional sealing strips 130 are held for reciprocation in sway against springs 128 near the end region of housing 122 and serve as the end walls of the central liquid container. The container portion is partially filled with liquid body 134 preferably to the tuned level. Rows of nozzles 132 are fixed in the container portion of tank 122 to dampen tank liquid oscillation. To assure that outward movements of pistons 126 work against the calculated spring force, wing chambers 136 should be vented to the atmosphere or vented to each other through duct 124 defined by plate 125 spanning the width of the tank and the top part of housing 120. If leakage into chamber 136 is a problem an air inflated flexible bag may be arranged therein to reserve compressible volume.

In operation, springs 128 urge pistons 126 to a predetermined location to center the liquid containing portion of tank 122 when the vessel is statically upright. When rolling occurs, the tank liquid responds by flowing toward one end of the tank or the other. At predetermined parts of the roll cycle, the tank liquid builds up first against one piston and then the other. At each of these occurrences, the respective piston is forced outward against the action of springs 128 thus achieving an elongation of the container and a beneficial lengthening of the stabilizing moment arm. As the outward liquid pressure is relieved against the piston, springs 128 move the same back near to its initial or stable position. In this way, the physical center of the liquid containing portion of the tank has freedom in the sway direction whereas only the end walls thereof are subject to movement.

Figure 2:
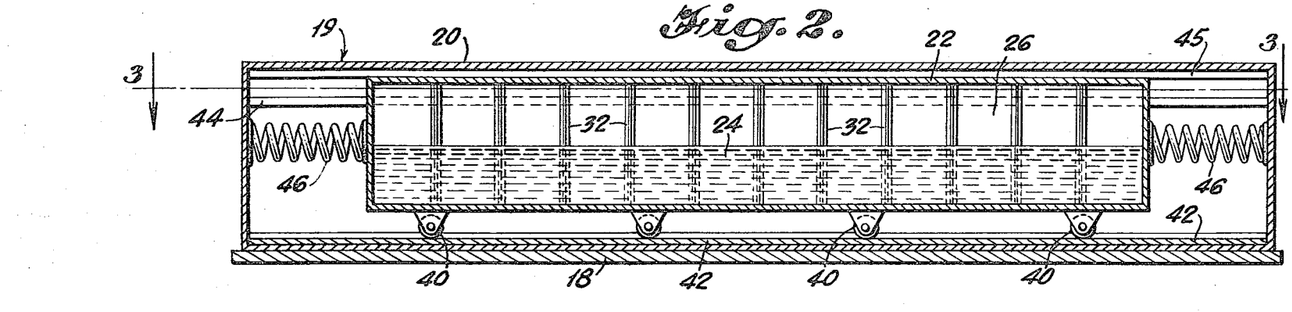
FIGURE 2 is a transverse vertical section of the stabilizer taken along line 2—2 of FIGURE 1.
Figure 3:
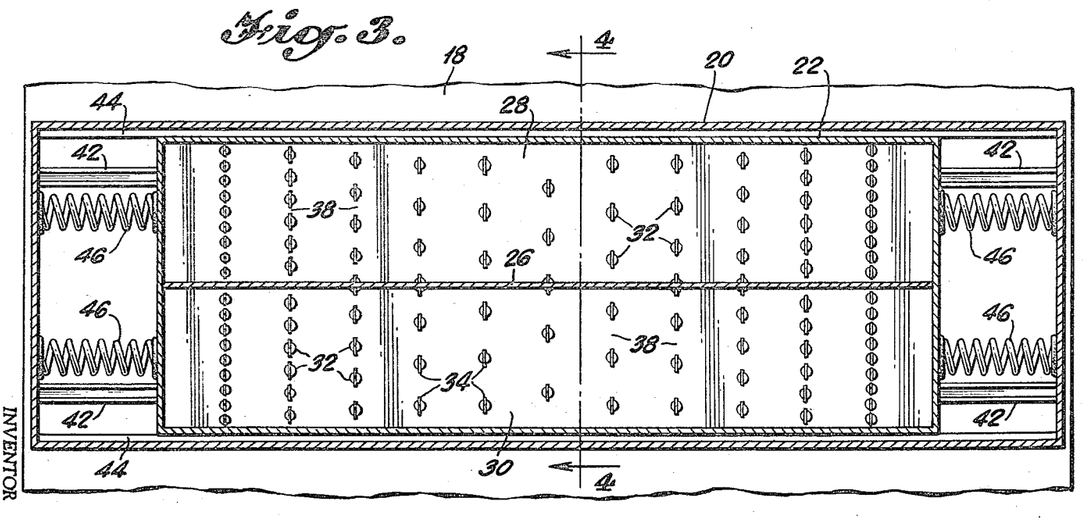
FIGURE 3 is a horizontal section of the stabilizer of FIGURE 2.

In one example of this invention installed on a craft with parameters set forth for the example of the embodiment of FIGURES 1 and 2, the liquid portion length of tank 122 is 6¾ feet, width is 31 inches, housing each wall spacing of piston 126 is one foot, and the housing height is one foot. As an alternate arrangement, pistons 126 can be mechanically tied together by means of a rod-like member (not shown) so as to move in unison.

It will be understood that other and further modifications can be made to the herein-disclosed examples of the invention without departing from the spirit and scope thereof. For example, the invention may be oriented in the craft and designed for pitch stabilization.

What is claimed is:

1. A tank stabilizer for vessels such as boats or the like comprising an elongated liquid containing tank located at or above the roll axis with its long axis arranged athwartship, a body of liquid partially filling said tank so as to move toward the ends of the tank in response to roll, means supporting at least the end walls of said tank on the vessel for movement and displacement relative to the vessel in direction of sway in response to forces imparted thereto by the tank liquid.

2. A stabilizer as set forth in claim 1 wherein said tank includes a plurality of constriction members imparting a predetermined amount of damping to the tank liquid motion, said tank liquid when moving imparting to the constriction members forces in the sway direction.

3. A stabilizer as set forth in claim 2 wherein said constriction members are designed so that if the tank and end walls were fixed in sway, the tank liquid would oscillate with a profile approximating a pure sinusoidal standing wave.

4. A stabilizer as set forth in claim 1 wherein said last-mentioned means includes at least one member coupled to the tank end walls and vessel for transmitting transverse whipping forces from the tank end walls when displaced in sway to the vessel, which forces contribute to the stabilizing movement.

5. A stabilizer as set forth in claim 4 wherein said at least one member comprises spring means arranged to impart transverse forces to the tank end walls and vessel in accordance with the magnitude and direction of sway displacement thereof from a zero reference.

6. A stabilizer as set forth in claim 5 wherein said means further comprises an outer housing fixed to the vessel and housing the tank, said housing and tank being mutually independent, tank supports supporting the tank for movement in sway and guides for guiding the tank movement in sway within the housing, said guides preventing any tank movement relative to the housing other than sway.

7. A stabilizer as set forth in claim 1 wherein the top of the tank is spaced from the tank liquid surface so as to permit an unimpeded transfer of air within the tank.

8. A stabilizer as set forth in claim 1 wherein the liquid level is adjusted so that the tank liquid natural oscillation period matches the vessel natural roll period.

9. A tank stabilizer for vessels such as boats or the like which experience oscillatory movement about an axis comprising an elongated tank located at or above said axis with its long dimension arranged transverse to said axis, a body of liquid partially filling said tank so as to move toward the ends of the tank in response to the vessel movement about said axis, means supporting at least the end walls of said tank on the vessel for movement and displacement relative to the vessel in the direction parallel to the tank long dimension in response to forces imparted to the tank by the tank liquid.

10. A tank stabilizer for vessels including an elongated tank having its long axis positioned transverse to the vessel's hull and having a liquid body partially filling said tank so that the liquid is in free surface condition throughout said tank, damping plate members arranged within the tank in rows extending fore and aft, each member being spaced from the others and extending above and below the liquid surface and having a pair of relatively sharp opposite edges such that each pair of adjacent members defines an orifice therebetween through which the tank liquid flows, each said member being shaped symmetrically to its fore and aft axis so that the orifice develops two dimensional flow in both longitudinal directions, and each member having bevelled surfaces intersecting the edges thereof at an angle greater than 30° to enhance liquid flow breakaway from the member.

11. A tank stabilizer as set forth in claim 1 wherein the tank stabilizer further includes damping plate members arranged within the tank in rows extending fore and aft, each member being spaced from the others and extending above and below the liquid surface and having a pair of relatively sharp opposite edges such that each pair of adjacent members defines an orifice therebetween through which the tank liquid flows, each said member being shaped symmetrically to its fore and aft axis so that the orifice develops two-dimensional flow in both longitudinal directions, and each member having bevelled surfaces intersecting the edges thereof at an angle greater than 30° to enhance liquid flow breakaway from the member.

12. A stabilizer as set forth in claim 10 wherein the spacing between said rows being sufficient to permit jet flow dissipation in the liquid after it passes through one row and before it reaches the next row.

13. A stabilizer as set forth in claim 11 wherein the spacing between said rows being sufficient to permit jet flow dissipation in the liquid after it passes through one row and before it reaches the next row.

14. A stabilizer as set forth in claim 5 wherein a tank housing is formed integral with said tank and extends beyond both end walls of the tank to form wing chambers therewith, said housing being fixed to the vessel and the chambers being generally gas filled, the end walls of the tank being arranged for athwartship reciprocation in response to the changing tank liquid pressure thereagainst.

15. A stabilizer as set forth in claim 14 wherein the wing chambers are vented for air pressure equalization and sealing means are provided to isolate the tank liquid from the wing chambers.

References Cited

UNITED STATES PATENTS 3,054,373  9/1962  Ripley ______________ 114—125
3,347,199  10/1967  Goodrich et al. ______ 114—125

TRYGVE M. BLIX, *Primary Examiner.*